April 16, 1957  J. W. THOMAS  2,788,900

THERMAL DIFFUSION APPARATUS

Filed Dec. 10, 1953

INVENTOR.
JOHN W. THOMAS

BY

Campbell, Brumbaugh, Free & Graves
ATTORNEYS

United States Patent Office 2,788,900
Patented Apr. 16, 1957

2,788,900
THERMAL DIFFUSION APPARATUS
John W. Thomas, Cleveland Heights, Ohio, assignor to The Standard Oil Company, Cleveland, Ohio, a corporation of Ohio
Application December 10, 1953, Serial No. 397,452
1 Claim. (Cl. 210—176)

The present invention relates to an improvement in thermal diffusion apparatus and more particularly to a device for promoting even temperature distribution over the working area of a wall member in a thermal diffusion apparatus.

Thermal diffusion apparatus of the flat plate type, such as that illustrated and described in U. S. Patent 2,541,069, granted February 13, 1951, to Jones and Hughes, generally comprises two closely spaced and substantially parallel wall members defining a separation chamber having a width of only a small fraction of an inch. The degree and rapidity of separation obtainable in thermal diffusion apparatus of this type is dependent upon the temperature gradient across this narrow separation chamber, the higher the temperature gradient, the more rapid and complete being the separation. A desirably high temperature gradient can be obtained by decreasing the width of the separation chamber, increasing the temperature difference between the opposed chamber-forming wall members or by a combination of both.

It will readily be appreciated that both these approaches to obtaining a high temperature gradient have some important limitations. Thus, for example, a number of difficulties arise and become magnified the more the width of the separation chamber is reduced. When the width is very small, i. e., of the order of about 0.03" or less, even small errors in machining the wall members can easily result in partial blocking of the chamber to the flow of liquid and barely preceptible buckling of one or both wall members due to thermal expansion or contraction may easily produce similar results. While the answer would appear to lie in raising the temperature of the hot wall and lowering the temperature of the cold wall, this avenue of approach is likewise fraught with difficulties. Fundamental among these is that the temperature of the hot wall must not exceed the boiling point or temperature of decomposition of the liquid subjected to thermal diffusion or any of the components therein, and the cold wall temperature must not be lower than the freezing point of said liquid and its components or low enough to increase the viscosity thereof to a degree sufficient to interfere with the movement of the liquid or any fraction thereof through the chamber.

Investigations have shown that wall members for thermal diffusion apparatus exhibit surprising fluctuations in actual temperature at closely adjacent locations on the separation chamber-forming surfaces. Thus, for example, when the operating temperature of a wall member is controlled by passing a temperature control fluid, a term intended herein to refer to liquids or vapors utilized to absorb or liberate heat, through a jacket or fluid chamber forming part of the wall member, the temperature of the separation chamber-forming wall may differ by as much as 50° at closely adjacent locations. These variations in temperature at closely adjacent locations are believed to be due to the channeling of jets of vapor or liquid from the inlets through the fluid chambers with the result that the areas subjected directly to the jets of fluid are heated to a higher temperature or cooled to a lower temperature than those portions depending for heat transfer upon eddy currents set up by the jets.

It is apparent that such uneven distribution of heat transfer in either direction, i. e., from the wall member to the heat regulating fluid or vice versa, reduces materially the possible maximum overall temperature difference between the hot and cold walls of a thermal diffusion apparatus. Thus, for example, if the temperature of the hot wall is allowed to vary as much as 50°, the average wall temperature may not be equal to the boiling point liquid or its components because otherwise the maximum temperature would exceed the boiling or decomposition point and therefore interfere seriously with the success of the operation. Similarly, if the temperature of the cold wall is below the freezing point of the liquid at some points, the fact that the average temperature of the cold wall is above the freezing point will not avoid difficulties due to freezing. Hence, it is necessary that the average hot wall temperature be maintained lower than the optimum and that the average cold wall temperature be maintained somewhat higher than the optimum.

It has now been found that the difficulties referred to can be substantially eliminated by providing, in thermal diffusion apparatus comprising a wall member having a jacket or fluid chamber with at least one inlet for introducing into the fluid chamber a temperature control fluid, a stream deflecting member spaced from and adjacent the inlet and in the path of the control fluid for deflecting the jet and thereby equalizing the rate of flow of fluid throughout the entire fluid chamber. In the preferred embodiment of the invention, the stream deflecting member is in the form of a disc or the like, spaced from and directly opposite the end of the inlet and of an area preferably about equal to or somewhat greater than the area available to the flow of fluid within the inlet. It is believed that the temperature control vapor or fluid entering the fluid chamber strikes the deflecting means and is thereby spread, in a direction substantially radially relative to the axis of the inlet, along the adjacent end of the fluid chamber whereupon it moves at a substantially uniform rate and with a substantially equal concentration through the chamber until it is discharged therefrom.

One of the primary advantages of the apparatus of the invention is the improvement in control over the temperatures of the hot or cold walls, or both, and the ability to increase the temperature gradient to which a given liquid can be subjected in a given thermal diffusion apparatus. Another advantage of the invention lies in the simplicity of the improvement that is responsible for the increase in temperature gradient obtainable.

These and other advantages, as well as the utility of the invention, will become further apparent from the following detailed description made with reference to the accompanying drawing wherein.

Figure 1:
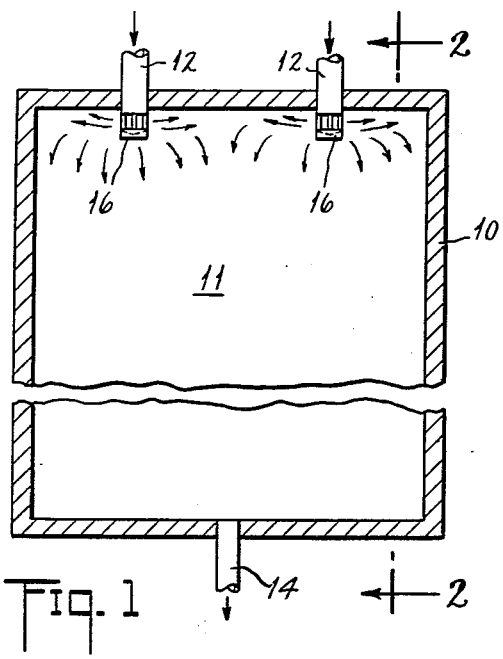
Figure 1 is a cross-sectional view in elevation showing the interior of a fluid chamber for receiving and discharging a temperature control fluid.
Figure 2:
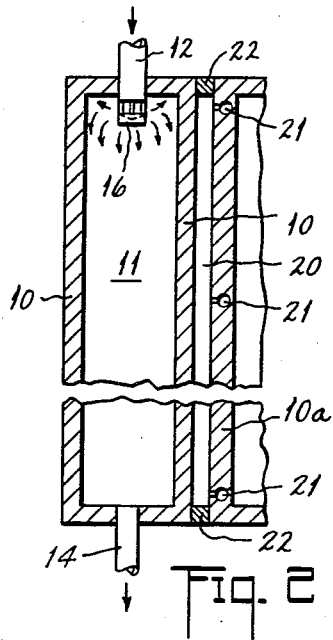
Figure 2 is an end view in cross-section taken on section line 2—2 of Figure 1.

Referring first to Figures 1 and 2, a wall member indicated generally at 10 is shown as provided with a fluid chamber 11, a number of equidistantly spaced inlet conduits 12, and an outlet conduit 14 for a temperature control fluid. As shown in more detail in Figures 3 and 4, a concave deflecting plate or cap 16 is spaced from the end 17 of the inlet 12 within the fluid chamber 11 by any suitable means such as supports 19.

As shown in Figure 2, the wall member 10 forms a separation chamber 20 having suitable inlets and outlets 21 with an adjacent wall member 10a spaced from the wall member 10 by means of a gasket 22 or the like. The liquid which is to be separated is introduced by means of inlet 21 to the separation chamber 20 and the separation chamber 20 will be completely full of liquid during the operation of the apparatus. It is to be understood, of course, that another thermal diffusion separation chamber, similar to separation chamber 20, can be similarly formed on the other side of the wall member 10.

Figure 3:
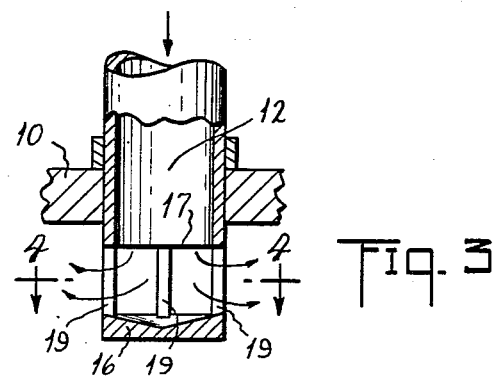
Figure 3 is a cross-sectional view in elevation on a larger scale showing in detail the construction of one embodiment of the deflecting means of the invention.
Figure 4:
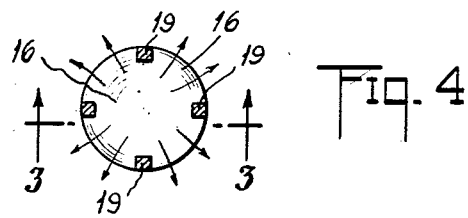
Figure 4 is a plan view taken along section line 4—4 of Figure 3.

In operation, the temperature control fluid, in the form of a liquid or vapor, enters the fluid chamber 11 by way of one or more inlet conduits 12 and is immediately deflected along the upper wall thereof in the manner best illustrated by the arrows in Figures 3 and 4, whereafter the fluid moves at a substantially equal rate and concentration of flow through the fluid chamber 11 as best indicated by the downwardly pointing arrows in Figures 1 and 2. The concave shape of the deflecting plate 16, referred to above, serves to direct the temperature control fluid against the upper inside surface of the wall member 10, which forms one wall of the separation chamber 20.

It is to be understood, of course, that the inlet and associated deflecting means need not necessarily be located at the top of the fluid chamber, but may just as readily be located at the bottom or sides of the chamber. Generally speaking, if the temperature regulating fluid normally condenses during the passage through the fluid chamber, it is preferable to introduce it at the top as is shown. On the other hand, if the temperature control fluid vaporizes or becomes lighter, it is generally preferable to introduce it at the bottom of the chamber.

These and other modifications will readily become apparent to those skilled in the art upon reading this description. All such modifications are intended to be included within the scope of the invention as defined in the accompanying claim.

I claim:

In thermal diffusion apparatus comprising two substantially parallel and closely spaced flat wall members forming a thermal diffusion separation chamber and temperature regulating means for relatively heating one of the flat wall members and relatively cooling the other of the flat wall members, wherein at least one temperature regulating means comprises a parallel flat member attached to said flat wall member adjacent the periphery thereof to form a rectangularly shaped fluid chamber which is provided with at least one inlet and one outlet for introducing into and removing from the fluid chamber a temperature control fluid, the improvement comprising an inlet projecting into said rectangular chamber provided with a stream deflecting member comprising a concave plate depending from and adjacent to and opposing said inlet to deflect said temperature control fluid laterally and upwardly and distribute it equally in substantially all lateral directions from said inlet thereby substantially equalizing the rate of flow of said fluid through the fluid chamber so that a uniform temperature will obtain in the fluid chamber.

References Cited in the file of this patent
UNITED STATES PATENTS

| | | |
|---|---|---|
| 916,340 | Lewis | Mar. 23, 1909 |
| 2,061,343 | Bickler et al. | Nov. 17, 1936 |
| 2,130,577 | Bacharach | Sept. 20, 1938 |
| 2,295,088 | Kleucher | Sept. 8, 1942 |
| 2,541,069 | Jones et al. | Feb. 13, 1951 |
| 2,541,071 | Jones et al. | Feb. 13, 1951 |